June 8, 1926.  1,588,286
C. WEISMANN
CONTROL MECHANISM
Filed August 9, 1921    8 Sheets-Sheet 1
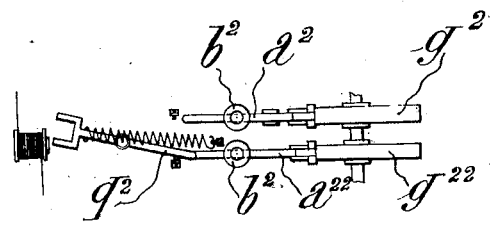
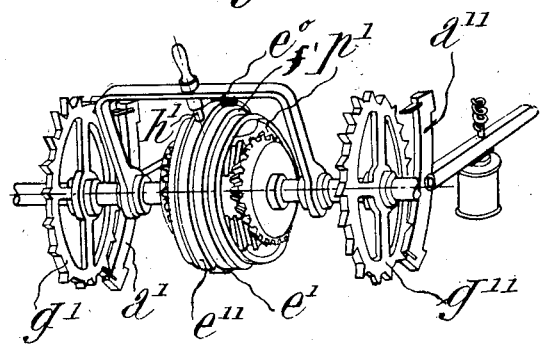
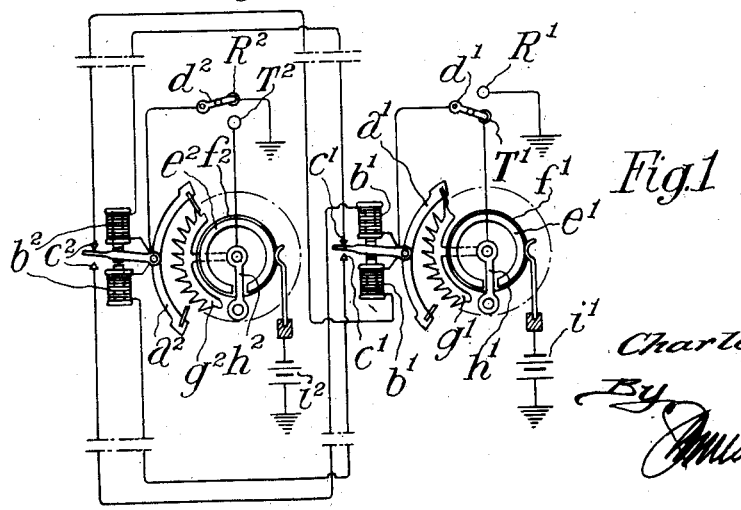
Inventor
Charles Weismann

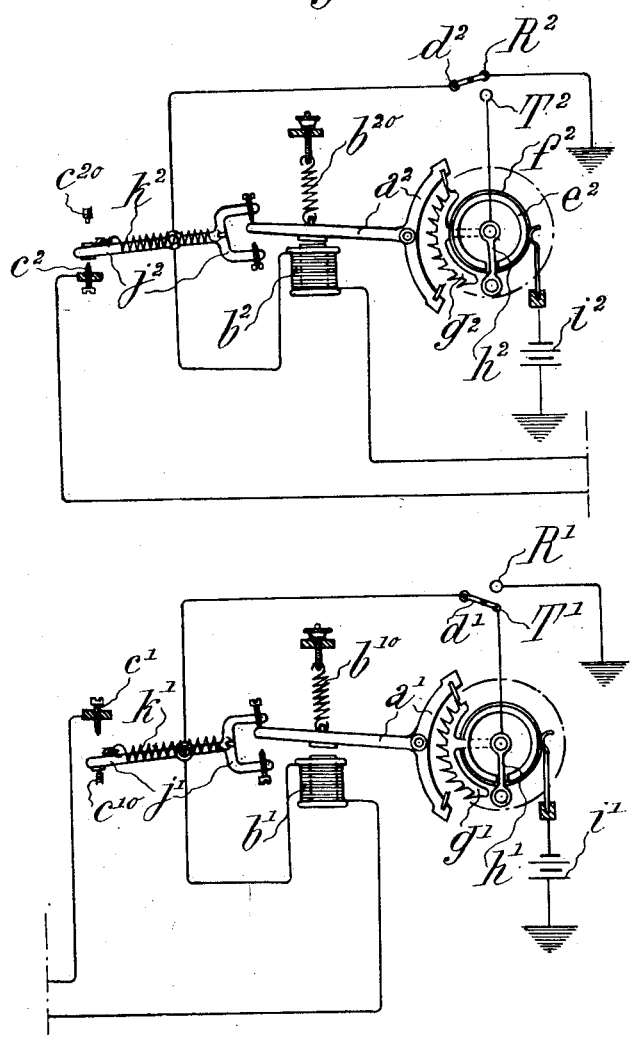

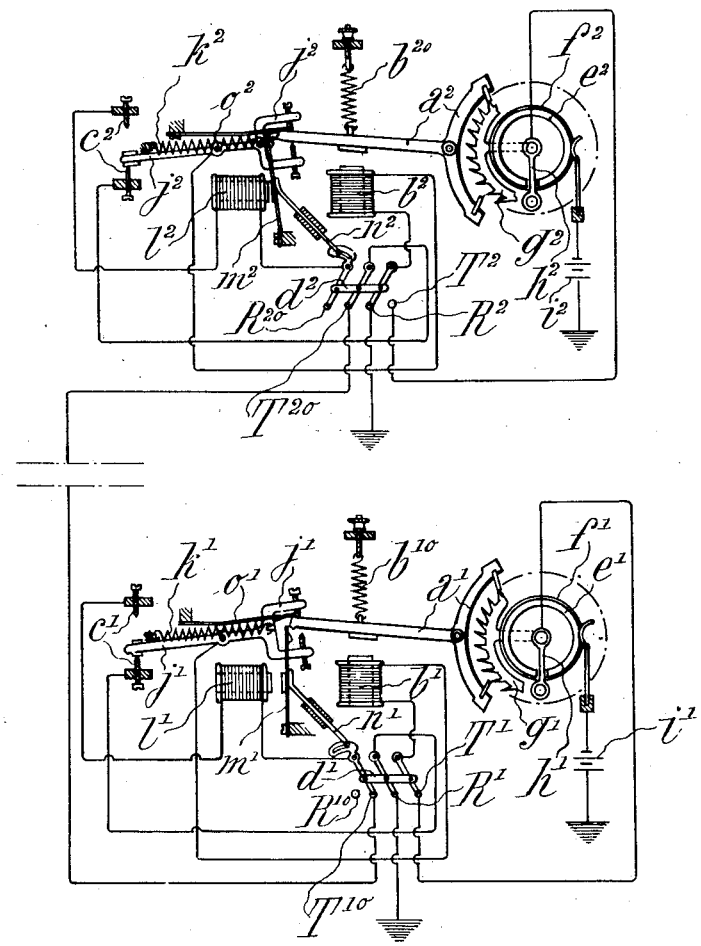

June 8, 1926.

C. WEISMANN 1,588,286

CONTROL MECHANISM

Filed August 9, 1921   8 Sheets-Sheet 4

Inventor
Charles Weismann

By
Attorney

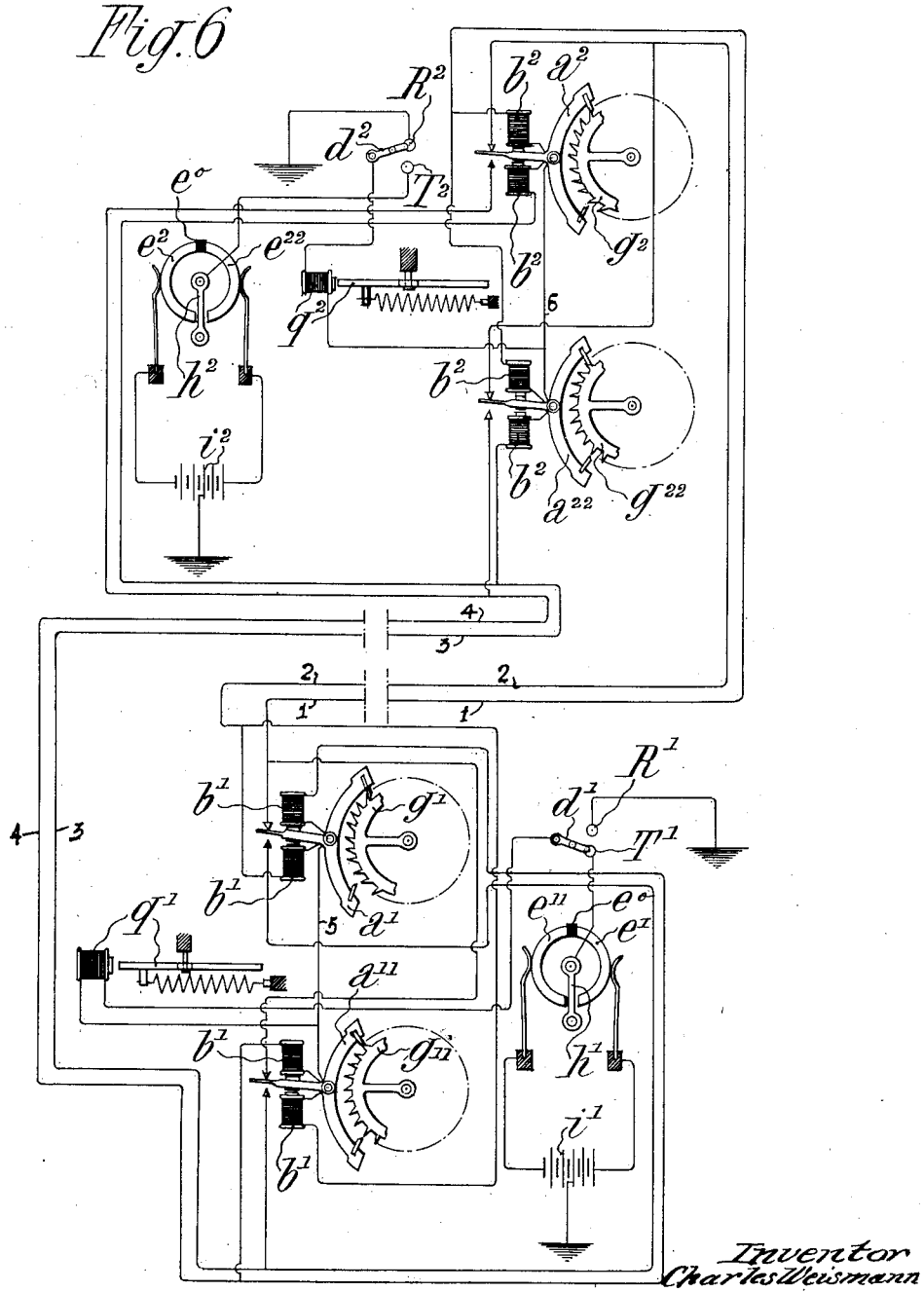

Inventor
Charles Weismann
Attorney

Patented June 8, 1926.

1,588,286

UNITED STATES PATENT OFFICE.

CHARLES WEISMANN, OF PARIS, FRANCE.

CONTROL MECHANISM.

Application filed August 9, 1921, Serial No. 491,028, and in France August 10, 1917.

This invention relates to control mechanisms and more particularly for controlling from a distance.

The invention has for its main object to make a control mechanism which is reliable in operation, more particularly from the point of view of concordance of movement among the various elements of the said mechanisms, and moreover, more economical to construct than those hitherto designed.

The invention mainly consists in using an escapement for constituting each of the two eseapement mechanisms, that is, the transmitting mechanism and the receiving mechanism, and in interconnecting the two escapements so that when one of them escapes once, it cannot escape a second time without the other having, in its turn, escaped also once, and conversely.

The invention further consists in other arrangements hereafter described, namely:

In one arrangement wherein great precision may be required with respect to the exact positions in which the escapement wheels stand, a set of toothed gear wheels is utilized, these gear wheels being arranged similarly to those of a gas meter, and such an arrangement will be more clearly set forth herein.

In a second arrangement according to which—in control mechanisms intended to work in the two directions, as for example, in arrangements wherein the initial control member of one escapement mechanism is controlled automatically, there is utilized a device of this general character.

It may be supposed that the initial control member of one escapement mechanism is controlled by a barometric device. In such a device, and the gearing actuated by it, an inherent lag occurs, and in consequence thereof, when the pressure of the air varies between two given values, the barometer will indicate a less variation than that which actually takes place. The average amount of such lag can be determined by experiment. If then, the escapement wheel controlled by the lagging barometer receives an additional leading movement each time the barometer needle reverses the direction of its slow movement, the lag of the initial control member connected with such needle will be compensated for by the lead which is given to the controlled escapement mechanism. This result can be obtained if the member which arrests the action of the escapement wheel of the control escapement mechanism is always actuated only after such escapement wheel has accomplished a certain fixed supplementary annular rotation, the lead thus obtained compensating for the lag of the initial control member of the controlling escapement mechanism. An example of such a construction will be hereinafter given.

The invention will be understood from the description which follows, as well as from the accompanying drawings, given as examples.

Figure 1 shows diagrammatically in elevation an electric distance control mechanism, constructed to work in one direction only, that is, in a clockwise direction.

Figure 2 shows in the same way, a modified construction of the same mechanism.

Figures 3, 4 and 5 show three successive positions of another form of mechanism embodying the invention.

Figure 6 shows, in the same way, a mechanism of the same type as that of Figure 1, but designed to work in the two directions.

Figure 7 shows diagrammatically, in plan, the detail of a locking element of the mechanism shown in Figure 6.

Figure 8 shows in a less diagrammatic manner, in perspective, means of interconnection between the elements working in opposite directions, of the same mechanism.

Figure 9:
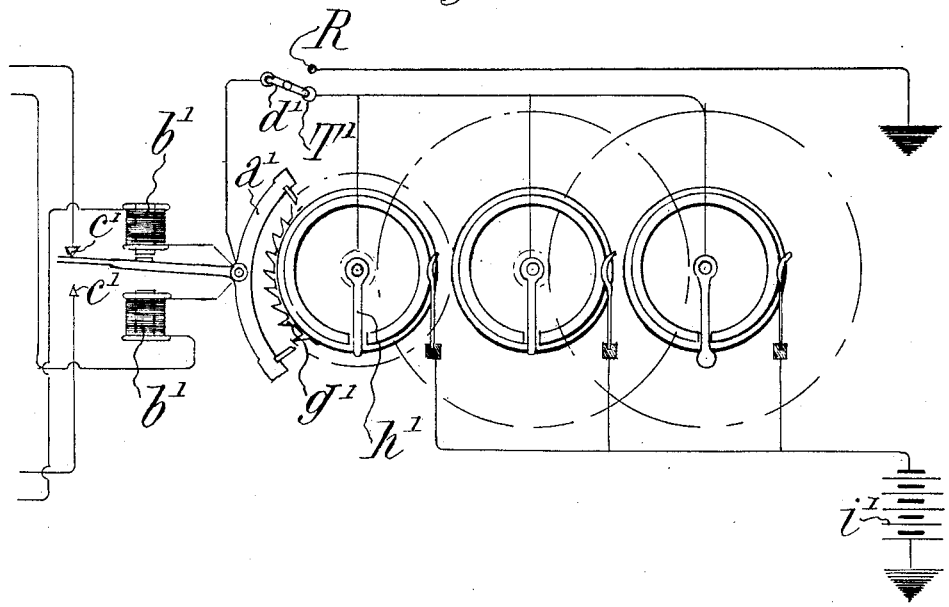
Figures 9 and 10 show respectively in the same way as Figure 1, and in corresponding plan, certain elements of a mechanism of the same kind transformed so as to give a much greater precision.
Figure 11:
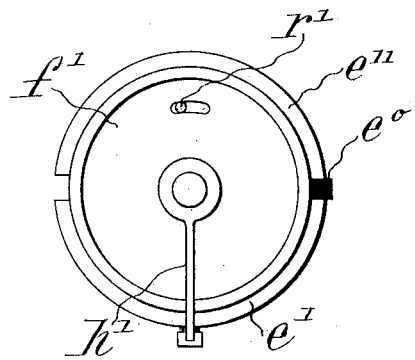
Figure 12:
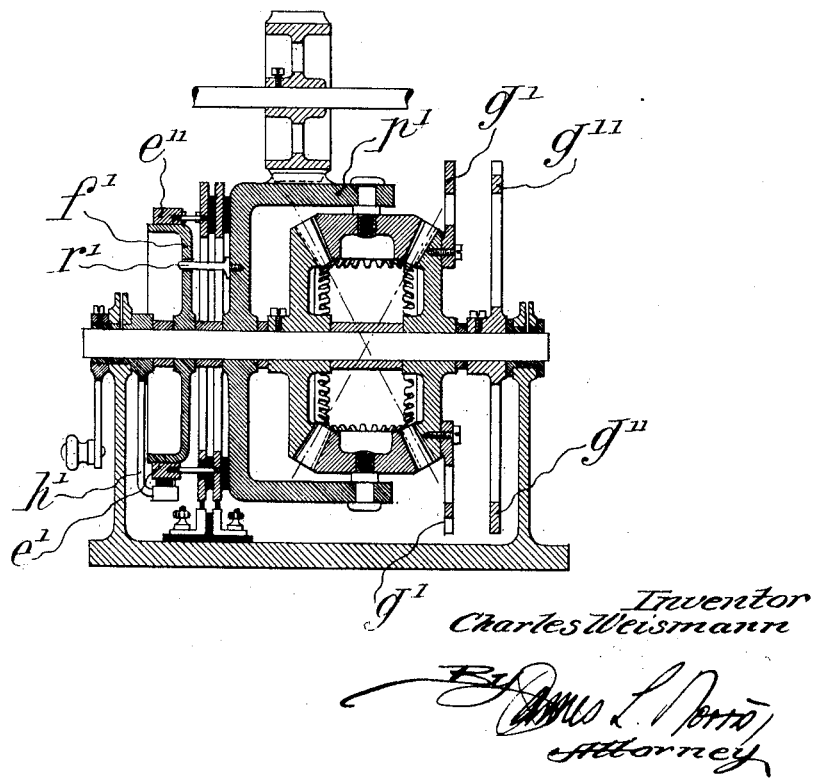

Figures 11 and 12, finally, show respectively in partial elevation and in section on a larger scale than the preceding figures, a modified construction which is more particularly advantageous in the majority of the cases in which it is desired to utilize such elements as those shown in Figure 9.

According to the invention, supposing that the latter is to be carried out so as to obtain an electric distance control mechanism, each station, which may be utilized at will as a transmitter or as a receiver, comprises escapements, anchors, ratchet wheels, and contact making arrangements of any suitable kind. The drawings show, as well known contact making arrangements, initial control levers $h'$ and $h^2$ (Fig. 1) and notched or slotted rings $e'$ and $e^2$. If the lever $h'$ or $h^2$ of the transmitting station is opposite to the notch in its respective ring, there is no electrical contact and the mechanism is at rest. As soon as one of these levers, as, for example, the lever $h'$, touches the contact ring $e'$, the mechanism commences to operate in such a manner that the slotted ring $e'$ moves in the same direction as the initial control lever has been moved. As soon as the notch or slot of the ring $e'$ comes opposite to the initial control lever, the operation of the mechanism is arrested and it is then at rest.

Instead of using a slotted ring construction as just described, the ring may be replaced by a simple contact stud. Then, as soon as the initial control lever touches the stud, the mechanism will start its operation, as before, and it will move in the same direction as that in which the initial control lever was moved. As soon as the initial control lever ceases its advancing movement, the stud will advance a slight distance beyond the initial control lever, whereupon the operation of the mechanism will cease and it will remain at rest until the initial control lever is again shifted. When this or like arrangements are used, the present invention may be carried out in the following manner.

Where the mechanism is to be constructed so as to work only in one direction, as for instance clockwise, an arrangement such as that illustrated in Fig. 1 may be used.

In this arrangement the two escapements to be used, one in one station and the other in the other station, are each provided with a suitable clockwork or other driving system not shown, and these escapements are non-reversible, that is to say only their anchors $a^1$ and $a^2$ are able to bring about their working reverse forces acting on their escapement wheels being unable to turn them. The tail of each anchor is made so that it may act as the armature of an electromagnet. At either side of the tail of each anchor, and in its plane of oscillation, are arranged a pair of electromagnets $b^1$, $b^2$; $b^2$, $b^2$ and a pair of contacts $c^1$, $c^1$; $c^2$, $c^2$. Thus each pair of electromagnets act on the tail of the respective anchor, and each time that one anchor becomes operative, its tail touches the corresponding contact, preferably elastically. Each of the said anchors is electrically connected to its pair of electromagnets, the other ends of which are connected to the two contacts of the other anchor. The connections are crossed in one of the pairs of line wires of the two parallel circuits thus formed, and non-crossed in the other pair. Each station is provided with a two-contact switch $d^1$ or $d^2$, the arm of which is electrically connected to the corresponding anchor, and with a commutator constituted by a conductor ring $e^1$ or $e^2$ provided with a slot and mounted on a supporting disc $f^1$ or $f^2$, which latter in its turn, is connected in such a manner to the corresponding escape wheel $g^1$ or $g^2$ that it follows the movements of the latter. A handle or lever $h^1$ or $h^2$ is provided which may be moved along the said ring and is narrower than the said slot.

One of the two contacts $R^1$ or $R^2$ of each of the said switches $d^1$ or $d^2$ is connected to earth for reception and the second contact $T^1$ or $T^2$ of each switch is connected to the corresponding handle $h^1$ or $h^2$ for transmission. At each station is arranged a source of current $i^1$ or $i^2$, which has one of its terminals connected to the corresponding conductor ring $e^1$ or $e^2$, and is grounded at its other terminal.

The operation of the device disclosed in Figure 1 is as follows. When at the transmitting station, for instance the station in which the switch $d^1$ has been brought to the transmission contact $T^1$, the handle $h^1$ is brought into a certain angular position, the circuit of the corresponding source of current $i^1$ is closed owing to the said handle contacting with the corresponding conductor ring $e^1$. The circuit can then be traced as follows: earth pole of electrical source $i^1$, said source $i^1$ commutator ring $e^1$, handle $h^1$, stud $T^1$, switch $d^1$, anchor $a^1$, lower electromagnet $b^1$, line wire, upper contact $c^2$, anchor $a^2$, switch $d^2$, stud $R^2$ and back to earth. The lower electromagnet $b^1$ being energized, the tail of the anchor is pulled down (away from the upper contact of the pair of contacts $c^1$) and rests then on the lower contact. In this latter position the current of the source $i^1$ divides in two halves: one flows through the lower electromagnet $b^1$ as already traced above, the other half coming out from the source $i^1$ flows through the conductor ring $e^1$, the handle $h^1$, stud $T^1$, switch $d^1$, anchor $a^1$, lower contact $c^1$, line-wire, lower electromagnet $b^2$, anchor $a^2$, switch $d^2$, stud $R^2$ and back to earth.

The lower electromagnet $b^2$ being thus energized, the tail of the anchor $a^2$ is pulled down in its turn whereupon the upper electromagnet $b^1$ is energized by the fact of its being a part of the following circuit: earth of source $i^1$, commutator ring $e^1$, handle $h^1$, stud $T^1$, switch $d^1$, anchor $a^1$, upper electromagnet $b^1$, lower contact $c^2$, tail of anchor $a^2$, switch $d^2$, stud $R^2$ and back to earth. The said upper electromagnet $b^1$ being energized the tail of the anchor $a^1$ is pulled upwards. This changes the circuit and it follows therefrom that the tail of the other anchor $a^2$ is also pulled upwards. The alternate movements of the anchors occur as long as the handle $h^1$ of the sending station is in electrical contact with the commutator ring $e^1$. The anchors work alternately (without either of them, after escaping one, escaping again until the other has also escaped once) and they remain in action in this way until, owing to the movement thus imparted, by the driving device of each escapement under the control of the anchors, to the two discs carrying the conductor rings, the slot of the ring $e^1$ is brought to the position given to the said handle $h^1$. The other ring $e^2$ is concurrently brought to an identical position but this does not cause the mechanism to operate, in spite of the other ring $e^2$ then engaging the corresponding handle $h^2$, because the said handle is switched out of circuit, by way of the switch $d^2$. It will be seen that the receiving station will repeat the movement of the initial control member (lever $h'$) of the transmitting station with an absolute concordance of movement of the respective discs $e'$ and $e^2$, these disks always coming to a stop in identical positions.

The same result may be also attained by applying to the mechanism different means of simplification, firstly such as replacing one of the electromagnets of each pair by a spring and one of each of the pairs of electrically operative contacts $c^1$, $c^1$ and $c^2$, $c^2$ of the arrangements on Figure 1 by simple abutments or stops, such as shown in Figures 2 and 3—and secondly a simplification which will be described subsequently with reference to Figure 2. The first of these two simplifications (Fig. 2) may be improved upon in order to ensure greater reliability of operation, by applying to the anchors a device already known in other applications, i. e. an oscillating fork with a spring forcing it always to swing completely as soon as it is brought in one or the other direction beyond its mean position. This improvement is shown in Figures 2 and 3, there being added to the tail of each anchor an oscillating jork $j^1$ or $j^2$ and a spring $k^1$ or $k^2$ in such a manner that the tail controls the fork to establish electric connections instead of itself establishing them; the whole mechanism is arranged so that whenever one of the electromagnets is energized, it is the corresponding fork, and no longer the corresponding anchor itself, which, under the impulse given to it by the latter, bears against one of the two corresponding contacts, and this only when the anchor completes its travel in one or in the other direction.

In the first of the constructions in question, that to which Figure 2 refers, the second simplification is obtained by replacing one of the two electromagnets of each anchor by a simple spring $b^{10}$ or $b^{20}$, and one of the two contacts of each anchor by a simple stop $c^{10}$ or $c^{20}$.

Owing to this only two line wires (instead of four) may be used in addition to the earth return, without any modification in the general construction being required.

In the second of the simplified constructions, shown in Figure 3, the application of the arrangements utilized in the same makes a single line possible, in addition to the earth return. With this construction, a single telegraph line and groundings suffice to connect the receiving and transmitting stations. The simplified construction is obtained by replacing, in each station, one of the two electromagnets of each anchor, of the construction shown in Fig. 1, by a single spring $b^{10}$ or $b^{20}$; by providing each elementary mechanism with a supplementary electromagnet $l^1$ or $l^2$; by using a switch $d^1$ or $d^2$ with three connected arms and four poles or contact studs in each elementary mechanism. The contact studs of the said switch comprise, in addition to a pair of studs $R^1$ or $R^2$, and $T^1$ or $T^2$ such as the preceding ones, an idle stud $R^{10}$ or $R^{20}$, and a line stud $T^{10}$ or $T^{20}$, these latter, $T^{10}$ and $T^{20}$, being electrically connected to each other by the single line utilized, whilst the three respective axes of the three levers of each of the switches in question are electrically connected as follows: first, that of the arms which engage the studs $R^1$ and $T^1$, or $R^2$ and $T^2$, to the beginning of the corresponding winding of the escapement electromagnet $b^1$ or $b^2$; the next, that of the lever which engages the studs $R^1$ and $T^{10}$, or $R^2$ and $T^{20}$, to the corresponding lower contact $c^1$ or $c^2$; and the third through the corresponding supplementary electromagnet $l^1$ or $l^2$ to the corresponding upper contact of the pair of contacts $c^1$ and $c^2$. In each of the elementary mechanisms, a spring blade $m^1$ or $m^2$ with a lip terminating the same, is arranged in such a manner that the said blade forms an armature for the corresponding supplementary electromagnet $l^1$ or $l^2$ and that its lip is in the normal unattracted position of said armature blade $m'$ or $m^2$ in the path of the tail of the corresponding anchor, so as to enable the latter to be engaged, that is to say locked, in the positions in the vicinity of those for said tail, is in its attracted position. The blade $m'$ or $m^2$ can occupy, in the construction shown in Figures 3, 4 and 5, a position in which its retaining lip is out of the path of the tail of the corresponding anchor $a'$ or $a^2$, under the action of either an electromagnet attraction of the supplementary electromagnet, or the mechanical pushing of either of these blades into a position where its lip cannot catch on the tail of its respective escapement anchor.

The mechanical pushing of the blade $m$ or $m^2$ is accomplished by a tappet rod $n'$ or $n^2$. These tappet rods are axially guided in fixed cylindrical guides. Each tappet rod can occupy either of two positions. The tappet rod $n^2$ is shown in one of its two positions at the left-hand side of Figures 3, 4 and 5, it then holding the blade $m^2$ out of the path of the tail of the anchor $a^2$ so that no catching action is then possible, irrespective of whether or not the supplementary electromagnet $l^2$ is magnetized.

In the second position of the tappet rod, such as that occupied by the rod $n'$ at the right-hand side of said figures, the tappet rod does not interfere with the movements of the blade $m'$, the latter being either in the catching or unattracted position when its supplemental electromagnet $l'$ is not magnetized, or being in its non-catching or attracted position when its respective supplementary electromagnet is magnetized.

Figure 4:
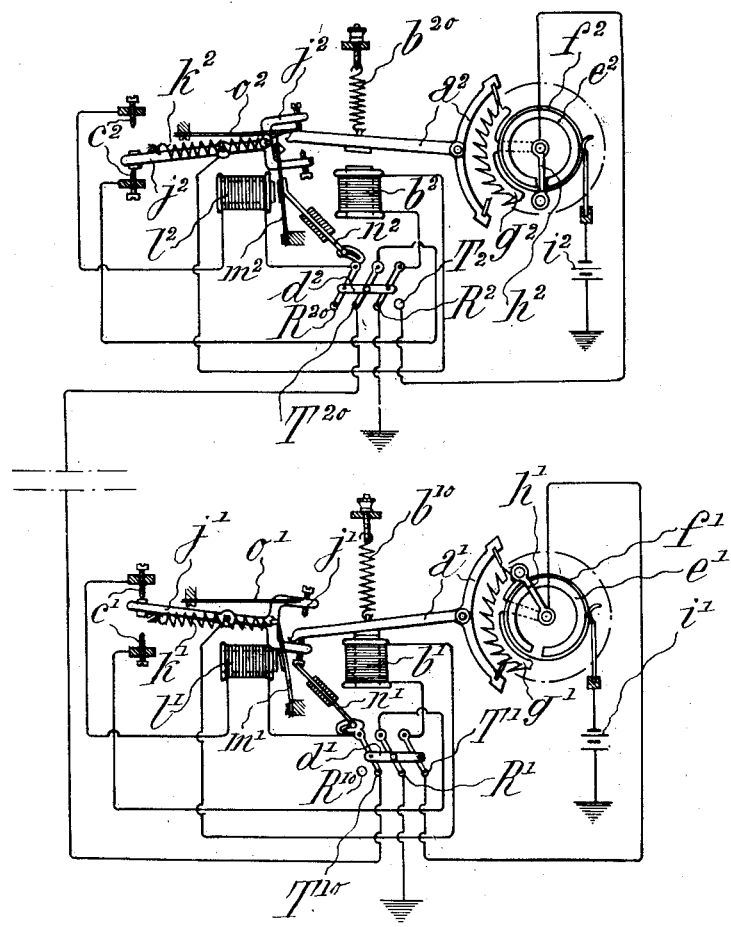
Figure 5:
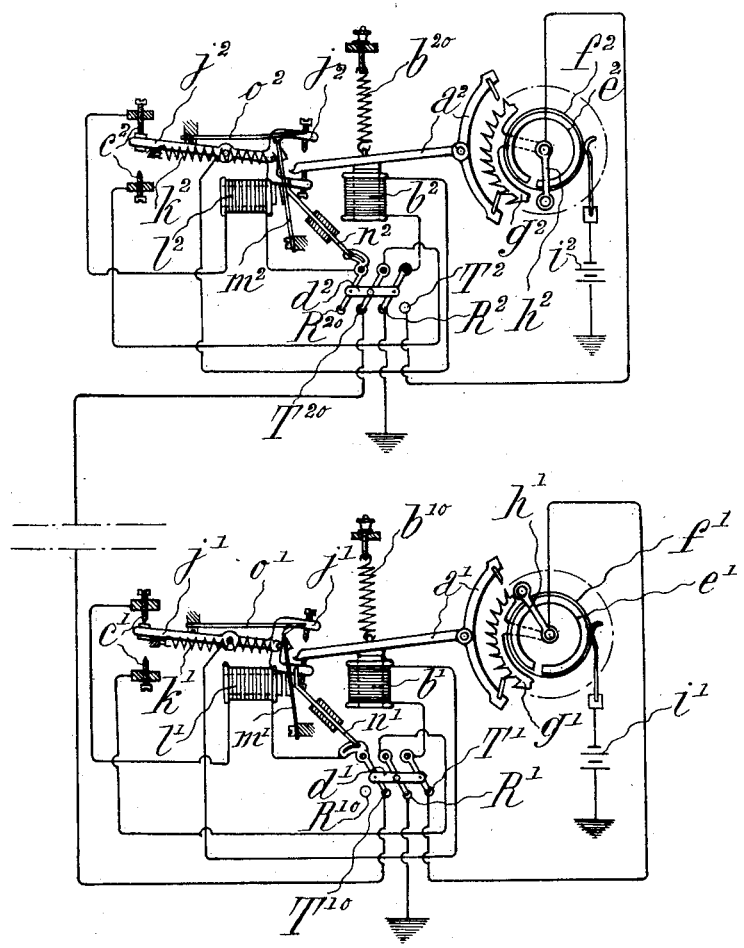

In short, in the left-hand station of Figures 3, 4 and 5 no catching action of the blade can take place, whereas in the right-hand station shown in these figures, the blade will catch the tail of the respective anchor if the supplementary electromagnet is not excited, and it will not catch the same if said electromagnet is excited.

The position of each of the tappet rods is determined by the position of the corresponding triple bladed switch $d'$ or $d^2$. The left-hand blade of each of these switches carries a tail with an elongated hole, the center line of which forms an eccentric path with respect to the pivotal center of the said blade, and a pin on the tappet rod projects into said elongated eccentric hole. Thus the position of each tappet rod will depend on the position of the respective switch which may be set in each station either for transmitting, as is the case with the right-hand station shown in Figures 3, 4 and 5, or for receiving, as is the case, with the left-hand station shown in these figures.

As already stated, the receiving station has its tappet rod $n^2$ in the active position in which the lip of the blade $m^2$ cannot exert a catching action. Preferably the tappet rod $n^2$ when in its active position, should not push the blade $m^2$ quite against the core of the supplemental magnet, in order to avoid the possibility of sticking of the blade on such core.

Furthermore, it is necessary in this construction to provide in each station a supplementary spring blade $o'$ or $o^2$ which also has a catching lip on its free end. Each of these supplementary spring blades is arranged at a right angle to the corresponding armature blade $m'$ or $m^2$, and its catching lip is so arranged that it will catch the free end of said armature blade when the latter is fully attracted by its electromagnet. The armature blade $m'$ or $m^2$ tends to always be caught by the supplementary spring blade $o'$ or $o^2$ when said armature blade comes into its attracted position. However, the supplementary spring blade is so arranged with respect to the upper part of the path of movement of the tail of the anchor $a'$ or $a^2$ that said tail will raise the supplementary blade and thus keep it out of the path of the free or upper end of the armature blade $m'$ or $m^2$. Thus the catching action of the spring blade $o'$ or $o^2$ will take place when the tail of the anchor is in its lower position, and will be prevented when said tail is in its upper position.

Owing to these arrangements, as shown clearly in Figures 3–6, each time that under the action of the escapement electromagnet $b^1$ or $b^2$ the tail of the anchor is projected from its upper into its lower position, the lip of the armature blade $m^1$ or $m^2$ maintains the said tail close to the latter position, in opposition to the action of the spring $b^{10}$ or $b^{20}$. This catching action exists during the short period of time which begins at the moment when, the anchor tail being attracted by the electromagnet $b^1$ or $b^2$ and engaging the fork $j^1$ or $j^2$, the latter ceases to bear against the lower contact of the pair of contacts $c^1$ or $c^2$ and thus brings about the breaking at this point of the excitation circuit of the said electromagnet, and which terminates at the moment when the fork completely swings over and comes into engagement with the upper contact of the pair of contacts $c'$ or $c^2$. The different changes in the electric circuits during a cycle of operations can be seen from Figures 3, 4 and 5. Figure 3 shows the mechanisms at the two stations at rest. In this figure the electric current source $i'$ of the right-hand station, which is shown switched for transmission, cannot operate its own escapement electromagnet $b'$, as the initial control member $h'$ is directly opposite to the insulating slot or notch of the commutator ring $e'$. The electric current source $i^2$ of the left-hand station in this figure, which is shown switched for receiving, cannot operate its own escapement electromagnet $b^2$ because of the open condition of the stud $T^2$ of the switch $d^2$. It will be understood that the electromagnet source $i'$ of the transmitting station must act undisturbed, and hence the electric current source $i^2$ of the receiving station must be totally idle or disconnected from the circuit, this being accomplished by setting the switch $d^2$ in the position shown in Figure 3. The transmission begins as soon as the initial control handle $h'$ of the transmitting station comes into electrical contact with the metallic commutator ring $e'$, the lever $h'$ being shown in such a position in the right-hand station of Fig. 4. The escapement electromagnet $b'$ of this station is then energized through the following circuit which may be traced on the right-hand side of Fig. 3, assuming that the handle $h'$ has been brought to the position shown in Figure 4. From the grounded or negative terminal of the electric current source $i'$ through said source, through the brush bearing on the commutator ring $i''$, through said commutator ring, thence to handle $h'$ in contact therewith, then to wire going from the center of said handle to the stud $T'$ of the switch $d'$, then to extreme right-hand blade of said switch, then to the winding of the escapement electromagnet $b'$, which is thus energized, to wire leading to the fulcrum of the fork $j$ to this fork, then to the lower contact of the pair of contacts $c'$, thence to wire terminated at the pivot of the middle blade of the switch $d'$, through said switch blade to stud $R'$, and then to ground through which the circuit is completed with the grounded or negative pole of the electric current source $i'$.

The escapement electromagnet $b^2$ of the receiving station cannot be energized while the fork $j'$ occupies the position shown in Figure 3, as the line wire going from switch stud $T^{10}$ to stud $T^{20}$ then receives no current.

The effect of the energizing of the escapement electromagnet $b'$ in the transmitting station is to effectively attract the tail of the anchor $a'$, this tail being shown in attracted position in Figure 4. The escapement wheel $g'$ thus advances through one step. During the movement of the tail of the anchor $a'$ from the position shown in Figure 3 to that shown in Figure 4, the catching effect of the armature blade $m'$ on the tail of the anchor $a'$ is effective, for two reasons, first, the tappet rod $n'$ is in its inoperative position, in which position the spring blade $m'$ can catch it, and second, the supplementary electromagnet $l'$ is not then excited, its circuit including, as will appear from Figure 3, the idle or open upper contact of the pair of contacts $c'$.

Therefore, return movement of the tail of the anchor $a'$ is prevented, even though the escapement magnet $b'$ should later become deenergized. This catching occurs effectively during the very short period during which the fork $j'$ is swinging from its lower position (Fig. 3) to its upper position (Fig. 4.)

As soon as the fork $j'$ has been struck by the tail of the anchor $a'$, which occurs at substantially the end of the descent of said tail, and its contact end, in consequence, has been swung from its lower position (Fig. 3) into its upper position (Fig. 4), the circuits are changed for both stations, with the following result:—In the left-hand or receiving station, the escapement electromagnet $b^2$ is energized and in the right-hand or transmitting station both the supplemental electromagnet $l'$ and the escapement electromagnet $b'$ are energized. The energizing of these three electromagnets is effected through the following circuits as traced in Figure 4:—

From the grounded or negative terminal of the source of electric current $i'$, through such source and from its positive terminal through the brush bearing on the commutator ring $e'$, thence through this ring to initial control handle $h'$ in contact therewith, and through the wire leading from the center of said handle to the stud $T'$ of the switch $d'$, then through the extreme right-hand switch blade to electromagnet $b'$, which is thus energized, then through the wire leading from this electromagnet to the fulcrum of the fork $j'$, through this fork to the upper contact of the pair of contacts $c'$, then through supplementary electromagnet $l'$, which is thus energized, and through the extreme left-hand blade of the switch $d'$ to the line stud $T^{10}$ of said switch, thence over the line wire leading from the right-hand or transmitting station to the left-hand or receiving station, thence through stud $T^{20}$ of the switch $d^2$ of the left-hand or receiving station, through the middle blade of the switch $d^2$, then through the wire leading from said middle switch blade to the lower contact of the pair of contacts $c^2$, then through the fork $j^2$ and over the wire leading from the fulcrum of said fork to the winding of the escapement electromagnet $b^2$, then passing through the winding of said electromagnet, which is thus energized, then through the extreme right-hand blade of the switch $d^2$ and through the stud $R^2$ and then returning through the ground to the grounded side of the electric current source $i'$.

The resulting movement produced by the currents in the circuits just described, are represented in Figure 5. The condition of the parts in the right-hand portion of this figure, which represents the transmitting station is as follows. The tail of the anchor $a'$ is speedily attracted, causing the escapement wheel $g'$ to remain at a standstill. The tail of this anchor is free of the possibility of being caught by the lip of the armature blade $m'$. This is particularly true while the parts are in the position shown in Fig. 5, as the spring blade $o'$ is in action and it hinders the return of the armature blade $m'$ into its catching position, even though the supplementary electromagnet $l'$ should become deenergized.

The energizing of the escapement magnet $b^2$ at the left-hand side of Fig. 5, which represents the receiving station, will cause the tail of the anchor $a^2$ to be attracted, as shown in this figure, so that the receiving escapement wheel $g^2$ will follow the one step advance previously accomplished by the transmitting wheel $g'$. The tail of the anchor $a^2$, in the last portion of its upward movement, has caused the contact end of the fork $j^2$ to swing over its lower position, shown in Fig. 4, to its upper position, as shown in Fig. 5. In this latter position, the fork bears on the upper contact of the pair of contacts $c^2$. This, of course, again changes the circuits, in consequence of which the electromagnet $b'$ and the supplementary electromagnet $l'$ will be deenergized in the transmitting station, and the escapement electromagnet $b^2$ will be deenergized in the receiving station. The deenergizing of said electromagnet $b^2$ has no practical consequence inasmuch as the spring armature $m^2$ is held in a non-catching position by the tappet rod $n^2$ as soon as a station is switched for receiving.

The deenergizing of the electromagnets $b'$ and $l'$ causes the parts to move, and to assume the following positions, references being had to Figure 3. The first result is to swing back the two tails of the anchors $a'$ and $a^2$ from the positions shown in Fig. 5 to the upper positions shown in Fig. 3. It will be understood that the anchor $a'$ can freely rise, notwithstanding the deenergizing of the supplemental electromagnet $l'$ of the transmitting station, as the vertical spring blade $m'$ continues to be held by the lip of the horzontal spring blade $o'$. As soon as the anchor $a'$ has reached its highest position it will strike against the free end of the horizontal spring blade $o'$ and it will thus free the vertical spring blade $m$ for action, as can be seen in Fig. 3.

When the anchors are in the position just described, either of two results may follow:—First, owing to the turning of the escapement wheel $g'$, the slot of the ring $e'$ may come opposite to the initial control handle $h'$, as shown in Figure 3, in which event, the operation of the mechanism ceases with the two escapement wheels $g'$ and $g^2$ resting in identical positions; or, if the handle $h'$ is still in electrical contact with the commutator ring $e'$ a new cycle of operations, as represented in Figures 3, 4 and 5 commences. It may be stated that each cycle of operations begins with the lowering of the tail of the anchor $a'$ of the transmitting station (Fig. 4) this being followed by the lowering of the tail of the anchor $a^2$ of the receiving station, and the cycle ends with the approximately simultaneous raising of both anchor tails, this restoring the tails to the positions shown in Fig. 3.

Thus one part of each cycle comprises successive movements and another part of each cycle comprises substantially simultaneous movements, this being a distinctive feature of the single line wire arrangement just described in connection with Figures 3, 4 and 5, as compared with the multiple line wire arrangement shown in Figure 1.

Each station is arranged so that it may be used alternatively for transmission or reception. It will be understood that when the positions of the two switches $d'$ and $d^2$ are reversed, the formerly passive receiving station becomes active through the action of its own electrical current source $i^2$, while the formerly active transmitting station becomes passive. By enabling a single wire to be used for the coordination of two stations, as is shown in Figures 3, 4 and 5, practical advantages are secured as will be readily understood.

The arrangements shown in Figs. 1 to 5, inclusive, are particularly suitable for use in stations where the initial control handle $h'$ is always rotated in the same direction, as, for example, the clockwise direction.

Where the mechanism is to be made so as to be capable of reverse operations, there may be employed a construction such as that illustrated in Figures 6–8, which construction differs from that shown in Figure 1 in the following respects. The two escapements $a^1$, $g^1$ and $a^2$, $g^2$ are duplicated by the addition of an identical system $a^{11}$, $g^{11}$ and $a^{22}$, $g^{22}$ but arranged so as to act in the opposite direction. The mounting of the second system relatively to the first, is effected so that all the elements of the same nature are coaxial as regards their axes of pivoting as seen in Figure 8 and the electromagnets, as well as the contacts are similarly duplicated. The split conductor rings $e^1$ and $e^2$ are duplicated by extending them over only about half the circumference and adding other conductor rings $e^{11}$ and $e^{22}$ visible in Figures 6, 7, 8, the length of the arc embraced by each of them being concurrently reduced to about 175°, so that each forms almost half a ring, each two half-rings $e^1$ and $e^{11}$ or $e^2$ and $e^{22}$ that cooperate with one and the same pair of escapements, being mounted, also concurrently, on a single supporting disc $f^1$ or $f^2$ (similar to the supporting discs of the Figure 1 such for instance as visible in Figure 8 and designated by $f^1$). A stop $e^0$ is provided on the said disc at a point diametrically opposite the common slot of the two half rings mounted on the same and so arranged that it prevents—when, at the transmitting station (the right hand station in Figure 6) the handle $h^1$ is operated in either direction—the said handle from bearing against the other half ring by way of, leaving the conductor half ring on which it was sliding.

As the two conductor half rings are mounted on the same supporting disc a common handle can be utilized for their operation ($h^1$ to the right and $h^2$ to the left of the Figure 6). In order that the clockwise and counter-clockwise acting escape wheels ($g^1$ and $g^{11}$ in one station in the Figure 6, and $g^2$ and $g^{22}$ in the other, may be both able to act on the supporting disc ($f^1$ in Figure 6) there is interposed between them a differential system. This construction is shown in Figure 8. The said escape wheels $g^1$ and $g^{11}$ are mounted respectively on the two main pinions thereof, the corresponding single supporting disc $f^1$ being at the same time mounted on the rim $p^1$ of the said differential system. The two oppositely acting anchors of each elementary mechanism ($g^1$, $g^{11}$, $g^2$, $g^{22}$ in Figure 6) are combined with a polarized bolt $q^1$ or $q^2$ adapted to lock that one of the anchors as seen in Figure 7 the action of which must necessarily be interrupted at a certain time. For this purpose the winding of the locking electromagnet is switched in each station between the switch $d^1$ or $d^2$ and a wire 5 or 6, as shown in Fig. 6, which unites the two anchors $a^1$, $a^{11}$ or $a^2$, $a^{22}$ of the same station. In Fig. 6 it will be seen that the current coming, for instance, from the locking electro-magnet $q^1$ is distributed to the two anchors $a^1$ and $a^{11}$. The whole of the current acting in the right-hand or transmitting station (Fig. 6) thus must flow through $q^1$, and the whole of the current acting in the left-hand or receiving station must flow through $q^2$. Thus a locking is obtained simultaneously in both stations. As the locking bolts of $q^1$ and $q^2$ are polarized, such bolts are shifted by their respective electro-magnets when the direction of current flowing through their respective electro-magnets is reversed. The effect of the movement of these polarized bolts is, that the same are shifted in both stations from one anchor tail to the other; for example, in the receiving station, from the tail anchor $a^{22}$ (Fig. 7) to the tail of anchor $a^2$, and in the transmitting station, from the tail of anchor $a^1$ to the tail of anchor $a^{11}$. The result obtained by the use of the locking bolts is that only one of the two escapements can be in action in each station at any given time, the other escapement at such time being locked. The anchors remain free to operate exactly in the same manner as those shown in Fig. 1 except that only half of the whole current flowing through the electro-magnets $q^1$ and $q^2$ is utilized for the step-by-step movements of the free anchors, the other half of the current passing idly through the electro-magnets and contacts of the locked anchors. In order to obtain sufficiently quick movements of the locking bolts, their electrical and mechanical inertia are so calculated that the movement brought about by their electromagnetic action occurs before the action caused by the passage of the current through the escapement electro-magnets of the free anchors takes place. In order to prevent the polarized locking bolts from occupying an intermediate position such bolts may, for example, comprise unstable fork members of the kind shown in Figure 7, said members after each energizing of the locking electromagnet acting to move the locking bolt system alternately between two stops which locks positively the tail of one or the other of the anchors $a^2$ or $a^{22}$. In each station, the two conducting half-rings are electrically connected respectively to the opposite terminals of the corresponding source of electricity, the said source being earthed in its centre.

It will be understood that with this construction the current flowing through the locking electro-magnets $q^1$ and $q^2$ is reversed when the handle $h'$ of the right-hand or transmitting station is shifted from the half ring $e'$ to the half ring $e^{11}$, and vice versa, so that the system of these half rings will be operated either in clockwise or in counter-clockwise direction.

In order that the correct operation of the electro-magnets may be possible for both directions, the wiring between the eight escapement electro-magnets and the eight anchor tail contacts as well as the four line wires of Fig. 6 is as follows:

Considering the anchors $a^1$ and $a^2$ as counter-clockwise anchors and the anchors $a^{11}$ and $a^{22}$ as clockwise anchors, and that the diagonally opposite anchors in Fig. 6 bring about the same direction of rotation on the half ring systems $e^{11}$, $e^1$ and $e^{22}$, $e^2$, the wiring is arranged in the following way: The line wire 1 is connected in the right-hand or transmitting station to the upper contact of counter-clockwise anchor $a^1$ and the upper contact of clockwise anchor $a^{11}$; and in the left-hand or receiving station this line wire is connected to the upper escapement electro-magnet of the counter clockwise anchor $a^2$ and to the upper escapement electro-magnet of clockwise anchor $a^{22}$.

Line wire 2 is connected, in the transmitting station, to the lower escapement electro-magnet of the counter-clockwise anchor $a^1$ and to the lower escapement electro-magnet of the clockwise anchor $a^{11}$, and in the receiving station, to the upper contact of the counter-clockwise anchor $a^2$ and to the upper contact of the clockwise anchor $a^{22}$.

Line wire 3 is connected, in the transmitting station, to the lower contacts of anchors $a^1$ and $a^{11}$, and, in the receiving station, to the lower escapement electro-magnets of anchors $a^2$ and $a^{22}$.

Line wire 4 is connected, in the transmitting station, to the upper escapement electro-magnets of anchors $a^1$ and $a^{11}$, and, in the receiving station, to the lower contacts of the anchors $a^2$ and $a^{22}$.

Assuming that the handle $h'$ in the right-hand or transmitting station is rotated in a clockwise direction to bring it into contact with the half ring $e^{11}$, the following active circuits will be established. Starting with the grounded center of the electrical source $i'$ the current flows from one pole of the current source $i'$ through the brush to the half ring $e^{11}$, to handle $h'$ and from the latter to the transmitting contact T′, switch handle $d'$, locking electro-magnet $q'$ of the polarized bolt, in which electro-magnet the current is to be considered as flowing in a direction to cause locking of the counter-clockwise anchor $a'$ and to leave the other anchor $a^{11}$ free for action, the current thence flowing to the wire 5 which connects the locked anchor $a'$ and the free anchor $a^{11}$. When the current reaches the wire 5 it divides into two parts. The circuit of the half current flowing through the locked anchors $a'$ and $a^{22}$ may be first considered. From the anchor $a'$ the current again divides into two parts, each of which is a quarter of the whole current. One of these quarters of the current flows through the lower electro-magnet of the anchor $a'$, thence to line wire 2, thence to the upper contact of the locked anchor $a^{22}$, wire 6 connecting the anchors $a^{22}$ and $a^2$, thence to the locking electro-magnet $q^2$ in which the current is to be considered as flowing in a direction to lock the anchor $a^{22}$ and leave the anchor $a^2$ free for action, the current then passing to switch $d^2$, the switch contact $R^2$ and then grounded for its return to the grounded center of the electrical current source $i'$. The other quarter of the current flows from the locked anchor $a'$ to the upper contact of this anchor, thence to line wire 1, thence to the upper electro-magnet of the locked anchor $a^{22}$, thence to the anchor $a^{22}$, through wire 6 connecting this anchor $a^{22}$ to anchor $a^2$, thence through the locking electro-magnet $q^2$, this quarter current flowing in the same direction through this electro-magnet as the first quarter current just described, and from the electro-magnet $q^2$ this second quarter of the current passes to the switch $d^2$ and contact $R^2$ to ground by which it returns to the grounded center of the electrical current source $i'$. The half current flowing through the two locked anchor systems $a'$ and $a^{22}$ has no effect other than to insure the locking positions of the locking devices $q'$ and $q^2$.

The half of the current which is directed, in the right-hand or transmitting station, toward the free anchor $a^{11}$ brings about the step-by-step operation of this free anchor and its fellow free anchor $a^2$ in the left-hand or receiving station. This operation is obtained in the following way, it being assumed that the tails of the free anchors $a^{11}$ and $a^2$ are in their upper positions at the commencement of operation. The half current which reaches the free anchor $a^{11}$ divides to form two quarters of the current. The first quarter current passes through the tail of this anchor $a^{11}$ to its upper contact, then through line wire 1 to the upper electro-magnet of the free anchor $a^2$ thus holding this anchor at rest with its tail in its upper position, then to anchor $a^2$ and finally through the locking device $q^2$, switch $d^2$ and contact $R^2$ to ground, through which it returns to the grounded center of the current source $i'$. The second quarter of the current flows from the free anchor $a^{11}$, thence through its lower electro-magnet, thence to line wire 2, thence to the upper contact of the free anchor $a^2$, thence through this anchor, thence to wire 6, and then through device $q^2$, switch $d^2$ and contact $R^2$ to ground and thence back to the grounded center of the current source $i'$. This last quarter of the current acts to draw downwardly the tail of the free anchor 11 at the right-hand or transmitting station, and when such movement takes place the corresponding escapement wheel $g^{11}$ is permitted to advance one step in consequence of which the circuit for the last two-mentioned quarters of the current is shifted as follows: One of these quarters of the current flows from the tail of anchor $a^{11}$ to its lower contact, thence through line wire 3 to the lower electro-magnet of the free anchor $a^2$, thence through this anchor $a^2$ to the wire 6, and finally, through the locking device $q^2$, switch $d^2$ and contact $R^2$ to ground and thus returning to the grounded center of the current source $i'$. The effect of this quarter of the current is to pull down the tail of the free anchor $a^2$ and thus cause the corresponding escapement wheel $g^2$ of the receiving station to follow the step made by the wheel $g^{11}$.

The other quarter of the current produces no movement, it simply holding the tail of the anchor $a^{11}$ in its lower position as such current flows from the anchor $a^{11}$ to its lower electro-magnet, line wire 2, upper contact of the anchor $a^2$, thence through this anchor to wire 6, and finally through the locking device $q^2$, switch $d^2$, contact $R^2$ to ground and thus returning to the grounded center of the current source $i$. The tails of both the anchor $a^{11}$ and the anchor $a^2$ are now in their lower positions. However, the lowering of the tail of the anchor $a^2$ at the receiving station changes the circuits for these two quarters of the current, as follows: One of these quarters of the current passes momentarily from one anchor $a^{11}$ to the lower contact of this anchor, then through line wire 3 to the lower electro-magnet of the anchor $a^2$, thus holding the tail of this anchor in its lower position, thence to anchor $a^2$, to wire 6 and then through the locking device $q^2$, switch $d^2$, contact $R^2$ to ground, and thus returning to the grounded center of the current source $i'$. The other quarter of the current flows from the anchor $a^{11}$ to its upper electro-magnet, thence to line wire 4, thence to the lower contact of anchor $a^2$, thence through this anchor, through wire 6, and thence through locking device $q^2$, switch $d^2$, contact $R^2$ to ground, and thus returning to the grounded center of current source $i'$. This quarter of the current causes the tail of anchor $a^{11}$ to be pulled upwardly and the escapement wheel $g^{11}$ in consequence is permitted to advance clockwise through another step.

At this time, the tail of anchor $1b$ is in its upper position while the tail of the anchor $a^2$ is still in its lower position, but the upward movement of the tail of anchor $a^{11}$ again shifts the courses open to the two active quarters of the current, as follows:

One quarter of the current now flows from anchor 11 to its upper electro-magnet, thence to line wire 4, the lower contact of the anchor $a^2$, the tail of which is now lowered, thence through this anchor to wire 6, and from the latter through the locking device $q^2$, switch $d^2$, contact $R^2$ to ground, and thus returning to the grounded center of the current source $i'$.

The other quarter of the current flows from the anchor $a^{11}$, the tail of which is elevated, to the upper contact of this anchor, thence to line wire 1, wire 6, thence through the locking devices $q^2$, switch $g^2$, contact $R^2$ to ground, and thus returing to the grounded center of the current source $i'$. This last quarter of the current pulls the tail of the anchor $a^2$ upwardly in consequence of which the corresponding escapement wheel $g^2$ makes another advance of one step in a clockwise direction.

Thus the anchors as shown in Fig. 6 assume new positions repeatedly and the step-by-step motion proceeds as long as the clockwise motion of the escapement wheel $g^{11}$ of the transmitting station has not brought the slot between the half rings $e'$ and $e^{11}$ under the handle $h'$. When the slot between the half rings reaches the handle $h'$, the operation ceases, as no current is then supplied from the electrical source $i'$. During the operation described, the locking devices $q'$ and $q^2$ remain immovable.

It may now be assumed that the handle $h'$ is moved in a counter-clockwise direction; that is, from the neutral slot between the half rings $e^1$ and $e^{11}$ onto the half ring $e^1$. The effect of this movement of the handle $h'$ on the polarized locking devices $q'$ and $q^2$ is to reverse the direction of current flow therethrough, as the current will now flow from the opposite pole of the current source $i'$ to the brush which is in contact with the half ring $e'$. The result of this reversal in the direction of current flow is that the polarized bolts of the locking devices $q'$ and $q^2$ move into their opposite extreme positions as compared with their former positions, in consequence of which the anchors $a^{11}$ and $a^2$ which before were free, now become locked, and the anchors $a^1$ and $a^{22}$, which before were locked, now become free for action. The action of the current on the now free anchors $a^2$ and $a^{22}$, through their electro-magnets, is exactly the same as that described for the anchors $a^{11}$ and $a^1$, notwithstanding the reversal of the direction of current flow, as the direction of current flow is immaterial in view of the fact that the anchors are not polarized.

Figure 8 shows the differential of the transmitting station, an identical system being provided also in the receiving station. This figure shows clearly how a differential system brings about a clockwise or a counter-clockwise rotation of the rim $p'$. This rim carries the planet pinions. If the anchor $a'$ is locked, the left main pinion of the differential system is at rest. If now the oscillation of anchor $a^{11}$ permits clockwise rotation of the escapement wheel $g^{11}$ and of the right main pinion of the differential system, the rim $p'$ is rotated, at half speed, in the same clockwise direction. If, on the contrary, anchor $a^{11}$ is locked and anchor $a'$ oscillates, the rim $p'$ will rotate in the counter-clockwise direction.

The rim of the differential system of the receiving station duplicates always the direction and the extent of angular movement of the rim of the differential of the transmitting station.

Figure 10:
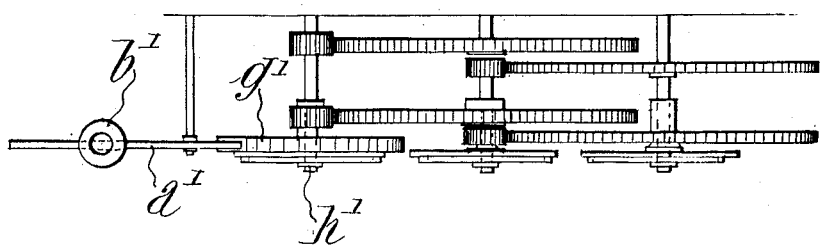

When an extreme precision is to be ensured, the following arrangements, to which Figures 9 and 10 relate, may be utilized. Instead of using in each elementary mechanism a single disc carrying a conductor ring with a corresponding handle, several such discs and handles, for instance, are used and when it is desirable to attain a precision one hundred times greater than in the preceding cases, three discs mechanically connected together by a set of gear wheels are used, these gear wheels being so arranged that the second and third discs are obliged to make respectively 10 and 100 revolutions when the first disc makes one. The conductor rings are electrically connected together so that they are in parallel and the handles are also electrically connected together in the same way. The escape wheel, with which the corresponding elementary mechanism is to be provided, is mounted on the disc which rotates at the highest speed, and preferably the said handles are mechanically connected together in the same manner as the said discs, that is to say by a set of gear wheels, so that it is only necessary to move the first handle until all the handles have reached their selected positions, in order to give to the three handles at the transmitting station the predetermined or desired positions, in which case the first handle occupies a position which is exact to one hundredth of a revolution.

When the described way of operating is followed, that is to say, when at the transmitting station the three handles are given determined respective positions, the escapements work until all the three discs carrying the conductor ring have been brought, both at the station in question and at the receiving station, to the same respective positions in which no current will pass into the escapement magnets, as the whole set of handles will then be opposite to the respective slots, as will be readily understood without an additional explanation. In some cases the arrangement shown in Fig. 9 may be modified in order to avoid the gearing between the initial control levers, although the gearing of the conductor ring discs will, of course, be utilized. In such a construction it will be necessary to control the position of each of the different initial control levers when a new position of the escapement wheel is desired.

Preferably in the case of mechanisms intended to work in the two directions, instead of simply mounting, in each of the elementary mechanisms, the conductor ring (that is to say the whole of the two half rings) or, more exactly, the supporting disc $f^1$ or $f^2$ of the said ring, on the rim $p^1$ or $p^2$ of the corresponding differential system, the following arrangements, indicated in Figures 11 and 12, are used. The supporting disc $f^1$ (or $f^2$) is mounted in such a manner, on a suitable portion of the frame of the corresponding mechanism, that it turns on it with a slight amount of friction. An elongated circular eye is provided in the said disc and the corresponding rim $p^1$ (or $p^2$) is so provided with a projection or finger $r^1$ (or $r^2$) that, as soon as the various parts of the whole mechanism have been assembled, the said finger projects into the said elongated eye. By using this construction, each time after the mechanism has worked in a certain direction, it is caused to work in the opposite direction, the supporting disc at each station begins to rotate only when the corresponding finger $r^1$ or $r^2$ has been brought into engagement with that end (of the corresponding elongated eye) which is opposite to that one with which it was in engagement up to that time. The effect of this construction is, that the duration of the new working is extended by a constant value which acts as a lead, and therefore the lag or lost motion which tends to take place, for example, in an initial control handle controlled by a sensitive apparatus, such as a barometer is made up, this however if the said elongated eye has been given the suitable length.

Obviously the invention—which is particularly suitable for systems of orientation at a distance, transmitters of orders, telautographs, pantelegraphs and selectors for automatic telephones,—is in no way limited to the constructions specified, but comprises constructions equivalent thereto, within the scope of the claims.

Having now particularly described and ascertained the nature of my said invention and in what manner the same is to be performed. I declare that what I claim is:—

1. In combination, a plurality of relatively distant stations adapted to serve respectively for transmitting and receiving, each station comprising a local electric current source, and initial control lever means and cooperating interrupted conductor ring means controlling the local electric current source, escapement wheel means connected to the conductor ring means, means for rotating said conductor ring means and escapement wheel means, escapement anchor means cooperative with the escapement wheel means to permit a step-by-step movement thereof, and escapement electromagnet means controlling the movements of said anchor means, interconnecting means between the stations for causing the anchor means of the receiving station to follow, step by step, the movements of the anchor means of the transmitting station, but preventing the anchor means of the transmitting station from causing advance of its escapement wheel means through another step until after the preceding step has been repeated by the escapement wheel means of the receiving station, contacts controlled by the anchor means in each station, and escapement electromagnet means operative to cause intermittent movements of the anchor means in said stations, said escapement electromagnet means being connected to the local electric current source of the transmitting station through the initial control lever means and conductor ring means of the transmitting station and being disconnected therefrom when the interruption of the conductor ring means of the transmitting station comes opposite to its initial control lever, whereby the conductor ring means of the transmitting and receiving stations will then come to rest in the same relative positions.

2. In a combination according to claim 1, switches adapted to switch any one of the stations either for transmission with the local electric current source connected therein, or for reception with the local electric current source disconnected therefrom.

3. In a combination according to claim 1 wherein the escapement wheel means for each station comprises a pair of co-axial escapement wheels, differential gear means for acting to turn the escapement wheels in different directions, each of the escapement wheels being fixed to one of the pair of main differential gears, a conductor ring bearing member fixed to the planet pinion carrier of the differential means, said conductor ring comprising two relatively insulated co-axial sections separated at one side of the ring by a projection and at the other side of the ring by an insulating slot, and locking means operative to lock one escapement wheel acting in one direction and to unlock the other escapement wheel acting in an opposite direction, as soon as the initial control lever comes into contact with one of the ring sections, said locking means being operative to lock the second mentioned escapement wheel and to unlock the first-mentioned escapement wheel for advancement, as soon as the initial control lever is in electrical contact with the other of the coductor ring sections.

4. In a combination according to claim 1 wherein the escapement wheel means for each station comprises a pair of coaxial escapement wheels, differential gear means operative to turn the escapement wheels in different directions, each of the escapement wheels being fixed to one of the pair of main differential gears, a conductor ring bearing member having means connecting it to the planet pinion carrier of the differential means, said conductor ring comprising two relatively insulated coaxial sections separated at one side of the ring by a projection and at the other side of the ring by an insulating slot, and locking means operative to lock one escapement wheel acting in one direction and to unlock the other escapement wheel acting in an opposite direction, as soon as the initial control lever comes into contact with one of the ring sections, said locking means being operative to lock the second-mentioned escapement wheel and to unlock the first-mentioned escapement wheel for advancement as soon as the initial control lever is in electrical contact with the other of the conductor ring sections, the connecting means between the conductor ring bearing member and the planet pinion carrier of the differential means permitting a lost motion between the planet pinion carrier and the conductor ring, whereby each time the initial control lever, after rotation in a given direction, is rotated in the opposite direction, said lost motion will produce an extension of the period of operation.

In testimony whereof I have hereunto set my hand.

CHARLES WEISMANN.